United States Patent
Ouhadi

(10) Patent No.: US 7,745,526 B2
(45) Date of Patent: *Jun. 29, 2010

(54) TRANSPARENT POLYOLEFIN COMPOSITIONS

(75) Inventor: Trazollah Ouhadi, Liege (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 63 days.

This patent is subject to a terminal disclaimer.

(21) Appl. No.: 10/982,394

(22) Filed: Nov. 5, 2004

(65) Prior Publication Data

US 2006/0100379 A1    May 11, 2006

(51) Int. Cl.
*C08K 5/01* (2006.01)
*C08L 23/00* (2006.01)

(52) U.S. Cl. .................. 524/474; 524/481; 524/482; 525/240

(58) Field of Classification Search ............. 524/474, 524/481, 482; 525/240
See application file for complete search history.

(56) References Cited

U.S. PATENT DOCUMENTS

| | | | |
|---|---|---|---|
| 3,795,720 A | 3/1974 | Schwarz | |
| 4,927,885 A * | 5/1990 | Hayashida et al. | 525/211 |
| 5,317,070 A | 5/1994 | Brant et al. | |
| 6,500,563 B1 | 12/2002 | Datta et al. | |
| 6,561,122 B1 | 5/2003 | Kurja et al. | |
| 6,642,316 B1 | 11/2003 | Datta et al. | |
| 2002/0123538 A1 | 9/2002 | Zhou et al. | |

FOREIGN PATENT DOCUMENTS

| | | |
|---|---|---|
| EP | 0 374 695 | 6/1990 |
| EP | 0 499 216 | 8/1992 |
| EP | 0 946 640 | 10/1999 |
| EP | 0 969 043 | 1/2000 |
| EP | 1 003 814 | 5/2000 |
| EP | 1 655 341 | 5/2006 |
| JP | 2002363361 | 6/2001 |
| WO | 98/27154 | 6/1998 |
| WO | 98/027155 | 6/1998 |
| WO | 99/07788 | 2/1999 |
| WO | 00/1766 | 1/2000 |
| WO | 00/69963 | 11/2000 |
| WO | WO 00/69965 * | 11/2000 |
| WO | WO 02/38383 * | 5/2002 |
| WO | 03/040233 | 5/2003 |
| WO | 2004/014988 | 2/2004 |
| WO | 2004/060994 | 7/2004 |
| WO | 2004/087806 | 10/2004 |

OTHER PUBLICATIONS

Escorez 1102, Tech.Data.*
ExxonMobil—Printout from www.exxonmobil.co.uk/ , p. 1/1.*
U.S. Appl. No. 11/402,333, filed Apr. 2006, Datta et al.*
U.S. Appl. No. 10/987,794, filed May 2005, Datta et al.*

* cited by examiner

*Primary Examiner*—Milton I Cano
*Assistant Examiner*—Gennadiy Mesh

(57) ABSTRACT

Disclosed herein are various compositions, including a transparent compositions with maximum haze of 50%, comprising (including): a first polymer component (FPC) that includes polypropylene having a melting point (Tm) $\geq 110°$ C.; a second polymer component (SPC) that includes a propylene polymer having 60 wt % or more units derived from propylene, including isotactically arranged propylene derived sequences and Tm<105° C. or a Heat of Fusion<45 J/g, or both; and a hydrocarbon resin having a Tg$\geq$20° C.; wherein: the SPC is present in the amount of $\geq$10 wt % and $\leq$70 wt % based on the total weight of a), b) and c) and the composition has: Haze value of $\leq$50 percent; and Shore A Hardness of 90 or below.

13 Claims, No Drawings

TRANSPARENT POLYOLEFIN COMPOSITIONS

BACKGROUND

1. Field of Invention

The claimed inventions herein relate to transparent thermoplastic polymer blend compositions for use in molded and extruded articles.

2. Description of Related Art

A variety of transparent thermoplastic compositions have been developed, some of which have been disclosed in the patent literature and/or introduced to the marketplace. Each of those compositions has a particular level of transparency, often characterized in terms of "haze," which is expressed as a percentage (%) in accordance with recognized test procedures. Shortcomings of those compositions include unsatisfactorily high haze values (low transparency), poor processability and poor mechanical properties, including undue hardness, low flexibility, etc. For example, previously proposed thermoplastic elastomer compositions with transparency and flexibility such as compounds based on styrene-ethylene-butadiene-styrene block copolymers, thermoplastic vulcanizate blends (TPV) or thermoplastic olefin (TPO) blends have reached transparency and softness levels that are still unsatisfactory in some applications.

It is among the objects of the invention to provide a transparent material that has a desirable balance of softness, flexibility and strength, and which can be easily processed in a molten state in extrusion or molding.

Polymer blends prepared for various applications are known. Adhesive blends that include hydrocarbon resins are disclosed in PCT Application No. WO 2004/087806. In Example 4 certain compositions include hydrocarbon resin with Tg>20° C. blended with two different types of polypropylenes, namely, minor amounts of polypropylene having a Tm≧110° C. and major amounts (72 wt % and above) of propylene-ethylene copolymer that has isotactically arranged propylene derived sequences and Tm<105° C.

U.S. Pat. No. 5,317,070 also discloses adhesive compositions that include a hydrocarbon resin with high glass transition temperature, but the polymers with which the compositions are blended are different from the polypropylenes claimed herein.

U.S. Pat. No. 6,500,563 discloses blends of two different types of polypropylene, including blends made from a polypropylene having a Tm≧110° C. and propylene-ethylene copolymer that has isotactically arranged propylene derived sequences and Tm<105° C.

Three component blends of isotactic polypropylene, impact modifying amounts of an ethylene propylene based rubber or low density ethylene copolymer and a propylene based elastomer as compatibilizer are described in EP946640, EP946641 (WO 98/027155), EP969043 and EP1098934.

WO04/014988 describes blends of isotactic polypropylene with non-functionalized plasticizers such as poly-alpha-olefins.

Unpublished U.S. Application Ser. No. 60/434097 filed 17 Dec. 2002 describes blends of polypropylene and propylene based elastomers to provide flexibility.

Dow WO03/040233 also discloses two component blends with the isotactic polypropylene as the predominant, matrix phase and the propylene-based copolymer serving as an impact modifier.

EP1003814 and U.S. Pat. No. 6,642,316 disclose two-component blends of small amounts of isotactic polypropylene and predominant amounts of an ethylene based elastomer.

EP374695 (WO 98/027155) Example 5 discloses visually homogeneous two component blends however using 40 wt % or less of the propylene-based copolymer.

WO00/69963 describes films made of two-component blends with from 75 to 98 wt % of a propylene ethylene based elastomer having a heat of fusion of less than 25 J/g. A process oil may be present.

SUMMARY

Disclosed herein are various compositions, including a transparent compositions with maximum haze of 50%, comprising (including): a first polymer component (FPC) that includes polypropylene having a melting point (Tm)≧110° C.; a second polymer component (SPC) that includes a propylene polymer having 60 wt % or more units derived from propylene, including isotactically arranged propylene derived sequences and Tm<105° C. or a Heat of Fusion <45 J/g, or both; and a hydrocarbon resin having a Tg≧20° C.; wherein: the SPC is present in the amount of ≧10 wt % and ≦70 wt % based on the total weight of a), b) and c) and the composition has: Haze value of ≦50 percent; and Shore A Hardness of 90 or below.

Also disclosed is a use for a composition comprising a first polymer component (FPC) that includes polypropylene having a melting point (Tm)≧110° C.; and a second polymer component (SPC) that includes a propylene polymer having 60 wt % or more units derived from propylene, including isotactically arranged propylene derived sequences and Tm<105° C. or a Heat of Fusion<45 J/g, or both, for the purpose of achieving a Haze value of ≦50 percent and a Shore A Hardness of 90 or below.

DETAILED DESCRIPTION

It is desirable for a composition to be transparent, and also to have other beneficial properties. Accordingly, compositions disclosed herein are not only highly transparent, with a haze value of 50% and below, e.g., down to 30% or below, or 15% or below; but also soft, with a Shore A Hardness of 90 and below, e.g., down to 80 or below, or 70 or below, or 60 or below. Furthermore, the compositions are also flexible and have excellent processability as well as other desirable properties, as noted below in the Examples.

The inventor has recognized that certain types of propylene polymers, particularly the SPCs identified herein, provide a desirable combination of properties, e.g., both transparency and processability. Moreover, it was observed that better mechanical properties could be achieved by restricting the amount of that SPC in favor of greater amounts of higher melting point thermoplastic. More specifically, a composition having no more than 70 wt % (or less) or 60 wt % (or less) or 50 wt % (or less) SPC exhibited desirable mechanical properties when polypropylene was also present in an amount of at least 20 wt % (or more) of the overall composition. Additionally, the inventor has discovered that certain thermoplastics surprisingly work better than others, when combined with the propylene polymer. For example, polypropylene provides excellent properties that other polymers such as polyethylene do not provide, since it was observed that polyethylene increases haze to undesirable levels, as reflected in the examples below. Substantial amounts of polypropylene, on the other hand, e.g., amounts ranging from 20 wt % or more, to 35 wt % or more, to 50 wt % or more, provide excellent mechanical properties, e.g., tensile strength, without causing the same degree of loss in transparency. However, at certain levels, even polypropylene likewise causes the composition to lose both transparency and softness. Although softness can be increased by adding additive oil (e.g., process oil), there is a level at which such oil creates problems such as exudation (weeping) or excessive tackiness. Therefore no more than 10 wt % or 15 wt % additive oil should be included in the composition, to minimize the danger of weeping or tackiness. Further, it has been discovered that including a hydrocarbon resin having a high Tg, e.g., 20° C. or higher, in the composition provides desirable levels of transparency (low haze) while also providing desirable levels of softness and strength. In a preferred composition such hydrocarbon resin is present in an amount of 5 wt % or more of the total composition, or 10 wt % or more, or 15 wt % or more, but preferably 20 wt % or less.

First Polymer Component (FPC)

Certain claims recite a "first polymer component" (FPC), which broadly can be any "thermoplastic component," defined herein to be any material that is not a "rubber" and that is a polymer or polymer blend considered by persons skilled in the art as being thermoplastic in nature, e.g., a polymer that softens when exposed to heat and returns to its original condition when cooled to room temperature. Preferably, the FPC is a polypropylene having one of the compositions and melting points disclosed below. The FPC is regarded as semicrystalline and contributes to strength but also to hardness.

The FPC (thermoplastic component) may contain one or more polyolefins, including polyolefin homopolymers and polyolefin copolymers. Except as stated otherwise, the term "copolymer" means a polymer derived from two or more monomers (including terpolymers, tetrapolymers, etc.), and the term "polymer" refers to any carbon-containing compound having repeat units from one or more different monomers. The predominant monomer may be ethylene which is then present in at least 50 mol %. Such polymers are referred to herein as ethylene based polymers. The comonomer may be selected from alpha-olefins having from 3 to 12 carbon atoms, or preferably from 4 to 10 carbon atoms or from copolymerizable monomers having a carbonyl moiety. The polymers preferably have an ethylenic type crystallinity. Illustrative polyolefins may be prepared from mono-olefin monomers including, but are not limited to, monomers having 2 to 7 carbon atoms, such as ethylene, propylene, 1-butene, isobutylene, 1-pentene, 1-hexene, 1-octene, 3-methyl-1-pentene, 4-methyl-1-pentene, 5-methyl-1-hexene, mixtures thereof and copolymers thereof with (meth)acrylates and/or vinyl acetates. The predominant monomer may be propylene which is then present in at least 90 wt %. The crystallinity is preferably of the isotactic propylene type. Preferably, the thermoplastic component contains one or more polypropylene homopolymers, polypropylene copolymers, or a combination thereof. The thermoplastic component may be added to the composition alone, or as a blend of two or more polyolefins. Preferably, the thermoplastic component is unvulcanized or non cross-linked.

In one or more embodiments, the thermoplastic resin component (preferably olefinic) contains one or more propylene homopolymers, propylene copolymers, or a mixture thereof. Preferred propylene copolymers include, but are not limited to, terpolymers of propylene, impact copolymers of propylene, random copolymers of propylene and mixtures thereof. Such propylene copolymers and methods for making the same are described in U.S. Pat. No. 6,342,565.

The term "random polypropylene" as used herein broadly means a single phase propylene copolymer having up to 9 wt %, preferably 2 wt % to 8 wt % of an alpha olefin comonomer. Preferred alpha olefin comonomers have 2 carbon atoms, or from 4 to 12 carbon atoms. Preferably, the alpha olefin comonomer is ethylene.

In certain embodiments, the olefinic thermoplastic resin component is or includes polypropylene. The term "polypropylene" as used herein broadly means any polymer that is considered a "polypropylene" by persons skilled in the art (as reflected in at least one patent or publication), and includes homo, impact, random, and isotactic propylene polymers. Preferably, the polypropylene used in the compositions described herein has a melting point above 110° C., includes at least 90 wt % propylene units, and contains isotactic sequences of those units. Alternatively, the polypropylene may include atactic sequences or syndiotactic sequences. The polypropylene can either derive exclusively from propylene monomers (i.e., having only propylene units) or derive from mainly propylene (more than 80% propylene) with the remainder derived from olefins, particularly ethylene, and/or $C_4$-$C_{10}$ α-olefins. As noted elsewhere herein, certain polypropylenes have a high MFI (e.g., from a low of 10, or 15, or 20 g/10 min to a high of 25 to 30 g/10 min. Others have a lower MFI, e.g., "fractional" polypropylenes which have an MFI less than 1.0. Those with high MFI may be preferred for ease of processing or compounding.

A preferred polypropylene is isotactic polypropylene. An illustrative isotactic polypropylene has a weight average molecular weight from about 200,000 to about 600,000, and a number average molecular weight from about 80,000 to about 200,000. A more preferable isotactic polypropylene has a weight average molecular weight from about 300,000 to about 500,000, and a number average molecular weight from about 90,000 to about 150,000. In one or more embodiments, the isotactic polypropylene has a molecular weight distribution (Mw/Mn) (MWD), also referred to as "polydispersity index" (PDI), within a range having a low 1.5, 1.8. or 2.0 and a high of 4.5, 5, 10, 20, or 40.

In one or more embodiments, the isotactic polypropylene preferably has a melt temperature ($T_m$) ranging from a low of 150° C., 155° C., or 160° C. to a high of 160° C., 170° C., or 175° C. The isotactic polypropylene preferably has a glass transition temperature ($T_g$) ranging from a low of −5° C., −3° C., or 0° C. to a high of 2° C., 5° C., or 10° C. The crystallization temperature ($T_c$) of the isotactic polypropylene component preferably ranges from a low of about 95° C., 100° C., or 105° C. to a high of about 110° C., 120° C. or 130° C., as measured by differential scanning calorimetry (DSC) at 10° C./min. Furthermore, the isotactic polypropylene preferably has a crystallinity of at least 25 percent as measured by DSC.

In one or more embodiments, the isotactic polypropylene has a melt flow rate of less than about 10 dg/min, preferably less than about 2 dg/min, and still more preferably less than about 1.0 dg/min. A preferred isotactic polypropylene has a heat of fusion of greater than 75 J/g, or greater than 80 J/g, or greater than 90 J/g.

In one or more embodiments, the isotactic polypropylene has a density of from about 0.85 g/cc to about 0.93 g/cc. In one or more embodiments, the isotactic polypropylene has a density of from about 0.88 g/cc to about 0.92 g/cc. In one or more embodiments, the isotactic polypropylene has a density of from about 0.90 g/cc to about 0.91 g/cc.

Such an isotactic polypropylene may be synthesized using any polymerization technique known in the art such as, but not limited to, the "Phillips catalyzed reactions," conventional Ziegler-Natta type polymerizations, and single-site organometallic compound catalysis, such as metallocene catalysis, for example. Illustrative metallocene catalyst compounds include, but are not limited to, the reaction products of metallocene-alumoxane and metallocene-ionic activator reagents. Illustrative polymerization methods include, but are not limited to, slurry, bulk phase, solution phase, and any combination thereof. Polymerization may be carried out by a continuous or batch process in a single stage, such as a single reactor, or in two or more stages, such as in two or more reactors arranged in parallel or series.

Second Polymer Component (SPC)

Certain claims recite a "second polymer component" (SPC) which is a propylene polymer, preferably having 60 wt % or more units derived from propylene, including isotactically arranged propylene derived sequences and also preferably having one of the melting points or heats of fusion disclosed below, e.g., Tm less than 105° C. or a heat of fusion less than 45 J/g, or both. This polymer has a low crystallinity and can be regarded as an elastomer. It contributes towards the flexibility and softness.

Preferably, the SPC is a "propylene copolymer." A "propylene copolymer" includes at least two different types of monomer units, one of which is propylene. Suitable monomer units include, but are not limited to, ethylene and higher (α-olefins ranging from $C_4$ to $C_{20}$, such as, for example, 1-butene, 4-methyl-1-pentene, 1-hexene or 1-octene and 1-decene, or mixtures thereof, for example. Preferably, ethylene is copolymerized with propylene, so that the propylene copolymer includes propylene units (units on the polymer chain derived from propylene monomers) and ethylene units (units on the polymer chain derived from ethylene monomers).

In one or more embodiments, the propylene copolymer contains at least 75 wt % of propylene-derived units. In one or more embodiments, the propylene copolymer contains from 75 wt % to 95 wt % of propylene-derived units. In one or more embodiments, the propylene copolymer contains from 80 wt % to 90 wt % of propylene-derived units. In one or more embodiments, the propylene copolymer can consist essentially of from 80 to 95 wt % repeat units from propylene and from 5 to 20 wt % of repeat units from one or more unsaturated olefin monomers having 2 or 4 to 12 carbon atoms.

Preferably, the propylene copolymer has crystalline regions interrupted by non-crystalline regions. The non-crystalline regions may result from regions of non-crystallizable polypropylene segments, the inclusion of comonomer units, or both. In one or more embodiments, the propylene copolymer has a propylene-derived crystallinity that is isotactic, syndiotactic, or a combination thereof. In a preferred embodiment, the propylene copolymer has isotactic sequences. The presence of isotactic sequences can be determined by NMR measurements showing two or more propylene derived units arranged isotactically. Such isotactic sequences may, in some cases be interrupted by propylene units that are not isotactically arranged or by other monomers that otherwise disturb the crystallinity derived from the isotactic sequences.

In one or more embodiments, the propylene-derived units of the propylene copolymer have an isotactic triad fraction of about 65% to about 99%. In one or more embodiments, the propylene-derived units of the propylene copolymer have an isotactic triad fraction of about 70% to about 98%. In one or more embodiments, the propylene-derived units of the propylene copolymer have an isotactic triad fraction of about 75% to about 97%.

Due to the introduction of errors in the insertion of propylene and/or by the presence of comonomer, the crystallinity and the melting point of the propylene copolymer are reduced compared to highly isotactic polypropylene. For example, the propylene-derived crystallinity of the propylene copolymer may range from about 2% to about 65% in one embodiment and from about 5% to about 40% in another embodiment as measured by Differential Scanning Calorimetry (DSC).

The crystallinity of the propylene copolymer can also be expressed in terms of "heat of fusion," measured using a Differential Scanning Calorimetry (DSC) test, most preferably in accordance with ASTM E-794-95. Preferably, about 6 mg to about 10 mg of a sheet of the polymer to be tested is pressed at approximately 200° C. to 230° C., then removed with a punch die and annealed at room temperature for 48 hours. At the end of that period, the sample is placed in a Differential Scanning Calorimeter (Perkin Elmer 7 Series Thermal Analysis System) and cooled to about −50° C. to −70° C. The sample is heated at about 10° C./min to attain a final temperature of about 180° C. to about 200° C. The thermal output is recorded as the area under the melting peak(s) of the sample, which is typically at a maximum peak at about 30° C. to about 175° C. and occurs between the temperatures of about 0° C. and about 200° C. The thermal output is measured in Joules as a measure of the heat of fusion.

The propylene copolymer may have a heat of fusion ranging broadly from 1.0 J/g to 90 J/g; or more narrowly from 2 J/g to 40 J/g; or from 5 J/g to 35 J/g; or from 7 J/g to 25 J/g. In one or more specific embodiments, the propylene copolymer has a heat of fusion of 75 J/g or less, or 50 J/g or less, or 35 J/g or less. Preferably, the propylene copolymer has a heat of fusion less than 45 J/g.

The "melting point" can be measured using the DSC test described above. Using the DSC test, the melting point is the temperature recorded corresponding to the greatest heat absorption within the range of melting temperature of the sample. When a single melting peak is observed, that peak is deemed to be the "melting point." When multiple peaks are observed (e.g., principal and secondary peaks), then the melting point is deemed to be the highest of those peaks. It is noted that at the low-crystallinity end at which elastomers are commonly found, the melting point peak may be at a low temperature and be relatively flat, making it difficult to determine the precise peak location. Furthermore, as with the DSC method, the peak location may be influenced by annealing and relaxation treatments. Therefore, it is recommended that the sample pretreatment procedure stated above for the DSC be followed.

The propylene copolymer may have any one of the following melting points, ranging from a lower limit of 25° C., or 30° C., or 35° C., or 40° C., or 45° C., or 50° C., to a higher limit of 105° C., or 100° C., or 95° C., or 90° C., or 85° C., or 80° C., or 85° C., or 80° C., or 75° C., or 70° C. In other specific embodiments, the melting point of the propylene copolymer can be expressed as any one of a selection of ranges, e.g., ranges of from 30° C. to 70° C. or from 40° C. to 50° C.

The crystallinity interruption described above may be predominantly controlled by the incorporation of the non-propylene monomer units. Accordingly, the comonomer content of the propylene copolymer may range from about 5 wt % to about 30 wt % in one embodiment and from about 8 wt % to about 30 wt % in another embodiment and from about 8 wt % to about 15 wt % in still another embodiment. In one or more of the compositions described herein, the propylene copolymer can have a comonomer content of greater than 8 wt %; or greater than 10 wt %; or greater than 12 wt %; or greater than 15 wt %.

Preferably, the propylene-derived crystallinity of the propylene copolymer is also selected to ensure the desired compatibility with the other ingredients of the TPV composition, e.g., with the other polymers in the thermoplastic resin component, as well as with the rubber component and additives. In a preferred aspect, the propylene-derived crystallinity is selected relative to any polypropylene resin present in the thermoplastic resin component. In some embodiments, the tacticity of the propylene copolymer and the tacticity of the thermoplastic resin component (which may include two or more different polypropylene polymers) may be the same or substantially the same. By "substantially" it is meant that these two components have at least 80% of the same tacticity. In another embodiment, the components have at least 90% of the same tacticity. In still another embodiment, the components have at least 100% of the same tacticity. Even if the components are of mixed tacticity, e.g., being partially isotactic and partially syndiotactic, the percentages in each should be at least about 80% the same as the other component in at least one or more embodiments.

In one or more embodiments, the propylene copolymer is made using random polymerization methods, including those described in U.S. Pat. Nos. 6,288,171; 6,525,157; 5,001,205; WO 96/33227; WO 97/22639; U.S. Pat. Nos. 4,543,399; 4,588,790; 5,028,670; 5,317,036; 5,352,749; 5,405,922; 5,436,304; 5,453,471; 5,462,999; 5,616,661; 5,627,242; 5,665,818; 5,668,228; 5,677,375; 5,693,727; 3,248,179; 4,613,484; 5,712,352; EP-A-0 794 200; EP-A-0 802 202; and EP-B-634 421. However, the propylene copolymer is not limited by any particular polymerization method. Suitable polymerization methods include solution, for example.

The propylene copolymer is also not limited by any or any particular type of reaction vessel. The propylene copolymer may in certain embodiments be formed in a single reactor. The propylene copolymer may in certain embodiments be formed in one or more series reactors (e.g., two or more reactors arranged in series). The propylene copolymer may in certain embodiments be formed in a batch reactor. Preferably, the continuous polymerization methods have sufficient back-mixing such that there are no concentration gradients within the reactor. Preferably, the propylene copolymer is formed using solution polymerization (as opposed to slurry or gas-phase polymerization) such that the catalyst system exists in a single-phase environment.

Furthermore, the propylene copolymer is not limited by any particular catalyst or catalyst system. In one or more embodiments, the catalyst system may include one or more transition metal compounds and one or more activators. Multiple activators may be used, including using mixtures of alumoxanes or aluminum alkyls with ionizing activators. When alumoxane or aluminum alkyl activators are used, the combined pre-catalyst-to-activator molar ratio is from 1:5000 to 10:1. When ionizing activators are used, the combined pre-catalyst-to-activator molar ratio is from 10:1 to 1:10. In one or more embodiments, the one or more catalyst systems disclosed in U.S. Patent Application 20040024146 published Feb. 5, 2004, may be used. In one or more embodiments, nonmetallocene, metal-centered, heteroaryl ligand catalyst systems as described in U.S. Patent Application 20030204017 published Oct. 30, 2003, may be used.

Preferably, the propylene copolymer is made in the presence of a metallocene catalyst system. As a nonlimiting example, illustrative metallocene catalyst systems may include, but are not limited to, a bis-indenyl compound, particularly a bridged bis-indenyl compound, and even more particularly a bridged bis-indenyl compound without any 2-substitutions. Alternatively, however, in one or more specific embodiments, any propylene copolymer used in an elastomeric structure may be prepared using a single site catalyst capable of permitting tactic insertion. For example, in at least certain embodiments, a polymer made in accordance with the disclosure of WO 03/0404201, owned by Dow Chemical Company, may qualify as a "propylene copolymer."

In one or more embodiments, the propylene copolymer has a Shore A hardness of less than about 90. In one or more embodiments, the propylene copolymer a Shore A hardness of about 45 to about 90. In one or more embodiments, the propylene copolymer has a Shore A hardness of about 55 to about 80.

In one or more embodiments, the propylene copolymer may have a molecular weight distribution (MWD) $M_w/M_n$ ranging from 1.5 to 40; or from 2 to 20; or from 2 to 10; or from 2 to 5. In one or more embodiments, the propylene copolymer may have a number average molecular weight of from 10,000 to 5,000,000; or from 40,000 to 300,000; or from 80,000 to 200,000, as determined by gel permeation chromatography (GPC). In one or more embodiments, the propylene copolymer may have a weight average molecular weight ($M_w$) within the range having an upper limit of 5,000,000 g/mol, or 1,000,000 g/mol, or 500,000 g/mol, and a lower limit of 10,000 g/mol, or 15,000 g/mol, or 20,000 g/mol, or 80,000 g/mol. Further, the propylene copolymer may have a Mooney viscosity (ML (1+4)@125° C.) from a low of 50, or 60, or 75, to a high of 80, or 90, or 100.

Hydrocarbon Resin

The claims recite a "hydrocarbon resin" with a high glass transition temperature (Tg), or a high softening point, or both. It is contemplated that the hydrocarbon resin can be any of a number of different types of polymers, as specified below, provided it has the requisite properties.

The hydrocarbon resin may be a thermally polymerized dicyclopentadiene resin which is preferably hydrogenated to achieve transparency and minimize discoloration. The hydrocarbon resin may also be a catalytically polymerized resin made using a Friedel-Crafts catalyst such as boron or aluminum halides. The hydrocarbon resin may be a cycloaliphatic resin or contain appropriate levels of aromatics.

A particularly preferred hydrocarbon resin is OPPERA RP 104, supplied by ExxonMobil Chemical Co, which has a Tg of 65° C. and a softening point ranging from 119 to 125° C.

Preferably, as noted below, the hydrocarbon resin is miscible with both, or at least one, of the polymer components (FPC and SPC). Also, the hydrocarbon resin itself should be clear, preferably colorless, or transparent; preferably, a water white cycloaliphatic hydrocarbon resin.

In at least certain embodiments, the hydrocarbon resin has a high glass transition temperature Tg, that is higher by at least 1° C. than the Tg of the composition (including process oil if present) when the hydrocarbon resin is absent. Alternatively, in certain embodiments, the Tg of the hydrocarbon resin is higher than the Tg of each of the other individual polymers.

In certain embodiments, the glass transition temperature Tg of the hydrocarbon resin is one within the range having a low of 20° C., or 30° C., or 40° C., and a high of 70° C., or 80° C., or 90° C. The hydrocarbon resin preferably has a glass transition temperature, by DSC, of greater than 20° C.

In certain embodiments, the hydrocarbon resin has a softening point within the range having a lower limit of 80° C., 120° C., or 125° C. and an upper limit of 140° C., 150° C., or 180° C. Softening point (° C.) is measured as a ring and ball softening point according to ASTM E-28 (Revision 1996).

Preferably, the hydrocarbon resin is amorphous and glassy, with low molecular weight. Preferably, the hydrocarbon resin has a lower molecular weight than either of the blend polymers. In certain embodiments, the hydrocarbon resin may have a number average molecular weight (Mn) within the range having an upper limit of 5000, or 2000, or 1000, and a lower limit of 200, or 400, or 500, a weight average molecular weight (Mw) ranging from 500 to 5000, a Z average molecular weight (Mz) ranging from 500 to 10,000, and a polydispersity (PD) as measured by Mw/Mn of from 1.5 to 3.5, where Mn, Mw, and Mz are determined by size exclusion chromatography (SEC).

The hydrocarbon resin should be present in the compositions in an amount ranging from a lower limit of 1%, 5%, or 10% by weight based on the total weight of the composition, to an upper limit of 30%, or 25%, or 20%, or 18%, or 15% by weight based on the total weight of the composition.

A hydrocarbon resin can include any of the following compounds, to the extent they are otherwise appropriate, e.g., having the requisite properties described elsewhere herein. Additionally, they should provide (or at least not reduce) transparency: Examples of hydrocarbon resins include aliphatic hydrocarbon resins, hydrogenated aliphatic hydrocarbon resins, aromatic modified aliphatic hydrocarbon resins, hydrogenated aromatic modified aliphatic hydrocarbon resins, polycyclopentadiene resins, hydrogenated polycyclopentadiene resins, cycloaliphatic hydrocarbon resins, hydrogenated cycloaliphatic resins, cycloaliphatic/aromatic hydrocarbon resins, hydrogenated cycloaliphatic/aromatic hydrocarbon resins, hydrogenated aromatic hydrocarbon resins, maleic acid/anhydride modified tackifiers, polyterpene resins, hydrogenated polyterpene resins, aromatic modified polyterpene resins, hydrogenated aromatic modified polyterpene resins, terpene-phenol resins, hydrogenated terpene-phenol resins, gum rosin resins, hydrogenated gum rosin resin, gum rosin ester resins, hydrogenated gum rosin ester resins, wood rosin resin, hydrogenated wood rosin resins, wood rosin ester resins, hydrogenated wood rosin ester resins, tall oil rosin resins, hydrogenated tall oil rosin resins, tall oil rosin ester resins, hydrogenated tall oil rosin ester resins, rosin acid resins, hydrogenated rosin acid resins, and mixtures of two or more thereof. These materials are preferably low molecular weight materials having a molecular weight (Mw) below 10,000, more preferably below 5,000, more preferably below 2500, more preferably below 2000, with suitable ranges falling in between 1 and 1000, more preferably 500-2000, more preferably 500-1000.

Specific examples of commercially available hydrocarbon resins include Oppera RP 100, 101, 102, 103, 104, 105, 106, 111, 112, 115, and 120 materials, and Oppera PR 131 hydrocarbon resins, all available from ExxonMobil Chemical Company, ARKON™ M90, M100, M115 and M135 and SUPER ESTER™ rosin esters available from Arakawa Chemical Company of Japan, SYLVARES™ phenol modified styrene- and methyl styrene resins, styrenated terpene resins, ZONATAC terpene-aromatic resins, and terpene phenolic resins available from Arizona Chemical Company, SYLVATAC™ and SYLVALITE™ rosin esters available from Arizona Chemical Company, NORSOLENE™ aliphatic aromatic resins available from Cray Valley of France, DERTOPHENE™ terpene phenolic resins available from DRT Chemical Company of Landes, France, EASTOTAC™ resins, PICCOTACT™ C5/C9 resins, REGALITE™ and REGALREZ™ aromatic and REGALITE™ cycloaliphatic/aromatic resins available from Eastman Chemical Company of Kingsport, Tenn., WINGTACK™ ET and EXTRA available from Goodyear Chemical Company, FORAL™, PENTALYN™, AND PERMALYN™ rosins and rosin esters available from Hercules (now Eastman Chemical Company), QUINTONE™ acid modified C5 resins, C5/C9 resins, and acid modified C5/C9 resins available from Nippon Zeon of Japan, and LX™ mixed aromatic/cycloaliphatic resins available from Neville Chemical Company, CLEARON hydrogenated terpene aromatic resins available from Yasuhara. The preceding examples are illustrative only and by no means limiting.

These commercial compounds generally have a Ring and Ball softening point (measured according to ASTM E-28 (Revision 1996)) of about 10-200 C, more preferably about 10-160 C, more preferably about 25-140 C, more preferably about 60-130 C, more preferably about 60-130 C, more preferably about 90-130 C, more preferably about 80-120 C, more preferably about 85-115 C, and more preferably about 90-110 C, wherein any upper limit and any lower limit of softening point may be combined for a preferred softening point range. For hydrocarbon resins a convenient measure is the ring and ball softening point determined according to ASTM E-28.

Additive Oil

Certain claims recite "additive oil," which as used herein includes both "process oils" and "extender oils." For example, "additive oil" may include hydrocarbon oils and plasticizers, such as organic esters and synthetic plasticizers. Many additive oils are derived from petroleum fractions, and have particular ASTM designations depending on whether they fall into the class of paraffinic, naphthenic, or aromatic oils. Other types of additive oils include alpha olefinic synthetic oils, such as liquid polybutylene, e.g., products sold under the trademark Parapol®. Additive oils other than petroleum based oils can also be used, such as oils derived from coal tar and pine tar, as well as synthetic oils, e.g., polyolefin materials (e.g., SpectraSyn™, supplied by ExxonMobil Petroleum & Chemical). The type of additive oil utilized will be that customarily used in conjunction with a particular rubber component.

The ordinarily skilled chemist will recognize which type of oil should be used with a particular rubber, and also be able to determine the amount (quantity) of oil. The additive oil can be present in amounts from about 0 to about 50 wt % of the total blend. The amount of additive oil may also be expressed as from about 5 to 40 wt %, and more desirably from about 10 to 30 wt % of the total blend.

Plasticizers

Certain claims recite "plasticizers." The term plasticizer is used to describe the usual use of the additive. Effects may be encountered in the context of the invention such as improved translucency or softness not normally encountered with plasticizers. The plasticizer may be a hydrocarbon oil, synthetic or natural oxygenated oil or synthetic base stock. Preferably the plasticizer is non-functionalized plasticizers ("NFP's") where the non-functionalized plasticizer has a kinematic viscosity ("KV") of 2 cSt or more at 100° C. Suitably the NFP has a flash point of more than 100 C and/or a KV at 100° C. of more than 2 cSt.

The plasticizer may comprise oligomers of C5 to C14 olefins having a viscosity index of 120 or more. Optionally the plasticizer comprises oligomers of C6 to C14 olefins having viscosity index of 120 or more. The non-functionalized plasticizer may also comprise linear and/or branched paraffinic hydrocarbon compositions produced by a gas to liquids process having a number average molecular weight of 500 to 20,000.

Blending

In one or more embodiments, the individual materials and components, such as the propylene copolymer, one or more thermoplastic components, additive oils, other additives, plasticizers, etc., may be blended by melt-mixing at a temperature above the melting temperature of the thermoplastic component. Examples of machinery capable of generating the shear and mixing include extruders with kneaders or mixing elements with one or more mixing tips or flights, extruders with one or more screws, extruders of co or counter rotating type, Banbury mixer, Farrell Continuous mixer, and the Buss Kneader. The type and intensity of mixing, temperature, and residence time required can be achieved by the choice of one of the above machines in combination with the selection of kneading or mixing elements, screw design, and screw speed (<3000 RPM). The blend may contain additives, which can be introduced into the composition at the same time as the other components or later at down stream in case of using an extruder or Buss kneader or only later in time. Examples of such additives are antioxidants, processing oils, antiblocking agents, antistatic agents, ultraviolet foaming agents, processing aids. Such additives may comprise from about 0.1 to about 10 percent by weight based on the total weight of blend. The additives can be added to the blend in pure form or in masterbatches. The process oil or plasticizer can be added in one addition or in multiple additions. Preferably, the plasticizers are added after sufficient molten-state mixing of the propylene copolymer and the one or more thermoplastic components. After discharge from the mixer, the blend can be processed to form a thermoplastic structure using any one or more following techniques: milling, chopping, extrusion, pelletizing, injection-molding, or any other desirable technique.

Specific Embodiments

Various specific embodiments are described below, at least some of which are also recited in the claims. For example, at least one specific embodiment is directed to a composition (e.g., as disclosed in the summary) that further comprises (includes) additive oil in an amount of from 1 wt % to 30 wt % based on the total weight of the first polymer component (component a), the second polymer component (component b) and the hydrocarbon resin (component c), together with the additive oil.

One or more of the compositions disclosed herein may have FPC present in the amount of $\leq 50$ wt % based on the total weight of components a), b) and c). Alternatively, the FPC may be present in an amount of $\leq 45$ wt %, or $\leq 40$ wt %, or $\leq 35$ wt %, or $\leq 30$ wt % and $\geq 25$ wt % or $\geq 20$ wt %, or $\geq 15$ wt %, or $\geq 10$ wt %, or $\geq 5$ wt %.

One or more of the compositions disclosed herein may have SPC present in the amount of $\geq 10$ wt % and $\leq 70$ wt % based on the total weight of components a), b) and c). Alternatively, the SPC may be present in an amount of $\geq 20$ wt %, or $\geq 25$ wt %, or $\geq 30$ wt %, or $\geq 35$ wt %, or $\geq 40$ wt %, and $\leq 70$ wt %, or $\leq 65$ wt %, or $\leq 60$ wt % and $\geq 55$ wt % or $\geq 50$ wt %.

As noted elsewhere herein, certain claims may reflect a specific embodiment that is (or includes) an article formed of any of the above compositions, wherein the article is formed by molding, extrusion, or calendaring. The article may be such that is useful as a sealing element, a grip, a touchpad, or an insert.

One of more of the compositions disclosed herein may include hydrocarbon resin that has a Tg $\geq 20\_°$ C. Alternatively, the Tg may be $\geq 10°$ C., or $\geq 30°$ C., or $\geq 40°$ C., or $\geq 50°$ C. and the Tg maybe $\leq 60°$ C., or $\leq 70°$ C., or $\leq 80°$ C., or $\leq 90°$ C.

Also, as noted elsewhere herein, any of the compositions disclosed hereinh may include polypropylene that is iPP, or ICP, or RCP.

Various terms as used herein are defined above. To the extent a term used in a claim is not defined above, it should be given the broadest definition persons in the pertinent art have given that term as reflected in at least one printed publication or issued patent.

EXAMPLES

The following tables refer to various compositions (samples), as well as certain differences in properties based on selected ingredients and proportions.

For purposes of convenience, various specific test procedures are identified in Table 1 for determining properties such as tensile strength, percent elongation at break, Shore A Hardness, Shore D Hardness, 100% Modulus, 200% Modulus, and 300% Modulus, and tear strength. However, when a person of ordinary skill reads this patent and wishes to determine whether a composition or polymer has a particular property identified in a claim, then any published or well-recognized method or test procedure can be followed to determine that property, although the specifically identified procedure is preferred. Each claim should be construed to cover the results of any of such procedures, even to the extent different procedures may yield different results or measurements. Thus, a person of ordinary skill in the art is to expect experimental variations in measured properties that are reflected in the claims. All numerical values can be considered to be "about" or "approximately" the stated value, in view of the nature of testing in general.

Each sample included SPC-B, a propylene copolymer formed according to the disclosure herein for making SPC polymers, using a metallocene catalyst, having a 17.46 wt % ethylene (ethylene derived units) with the balance being units derived from propylene. The melting point of SPC-2 was about 50° C.; the heat of fusion was about 15 J/g; Mooney Viscosity (ML (1+4) at 125° C.) was 22.7 as measured according to ASTM D 1646. The SPC copolymer was prepared in a 1 liter internal volume Continuous Flow Stirred Tank Reactor. Hexane was used as the solvent. The liquid full reactor had a variable residence time of approximately 9 to 15 minutes and the pressure was maintained at 700 kPa. A mixed feed of hexane, ethylene and propylene was pre-chilled to approximately −30° C. to remove the heat of polymerization before entering the reactor. The solution of catalyst/activator in toluene and the scavenger in hexane were separately and continuously added to the reactor to initiate the polymerization. The reactor temperature was maintained around 70° C. Hexane at 3.56 kg/hr was premixed with both ethylene at rate 60 g/hr and propylene at rate 812 g/hr and fed to the reactor. The polymerization catalyst, dimethyl silyl bridged bis-indenyl hafnium dimethyl, was activated in situ in 1:1 molar ratio with N,N'-Dimethyl anilinium-tetrakis(heptafluoro-1-napthyl)borate and introduced into the polymerization reactor at the rate of 0.0135 g/hr. A dilute solution of triisobutyl aluminum was introduced into the reactor as a scavenger for catalyst terminators. A rate of approximately 1.11 mole of scavenger per mole of catalyst was adequate for this polymerization. After five residence times of steady polymerization, a representative sample of the copolymer produced in this polymerization was collected. The solution of the copolymer was withdrawn from the top, and then steam distilled to isolate the copolymer. The polymerization rate was measured to be about 0.26 kg/hr. The copolymer produced in this polymerization was analyzed for ethylene content by FTIR. The molecular weight averages were measured by GPC. Crystallinity was measured by DSC and the amount of mm triads of propylene residues in the copolymer chain was determined by 13 C NMR.

Each sample included OPPERA RP 104, a hydrocarbon resin supplied by ExxonMobil Chemical Co., described above in greater detail. Certain samples included Plastol 542, a process oil, supplied by ExxonMobil Chemical Co. Different polypropylene or polyethylene polymers with different properties (e.g., different MFRs) were included in certain of the samples; the polyethylenes were included for comparison purposes. Exact 5062 is a metallocene catalyzed polyethylene copolymer plastomer having a density of 0.860 and MFR of 0.50 g/10 min supplied by ExxonMobil Chemical Co. PP HL 512 FB is a high flow homo polypropylene, having an MFR of 1200 g/10 min. (2.16 kg at 230° C.) supplied by Borealis. PP HL 504 FB is a homo polypropylene, having an MFR of 400 g/10 min. (2.16 kg at 230° C.) supplied by Borealis. PP HF 136 MO is a homo polypropylene, having an MFR of 20 g/10 min. (2.16 kg at 230° C.) supplied by Borealis. PP HA 507 is a homo polypropylene, having an MFR of 0.80 g/10 min. (2.16 kg at 230° C.) supplied by Borealis. PP 3546 G is an isotactic homo polypropylene, having an MFR of 2100 g/10 min. (2.16 kg at 230° C.) supplied by ExxonMobil Chemical Co.PP.8013 L1 is a reactor polypropylene copolymer, having an MFR of 8 g/10 min. (2.16 kg at 230° C.) supplied by ExxonMobil Chemical Co. ADSYL 5 C 30 F is a random polypropylene terpolymer (with C2 and C4 as comonomers) having MFR of 5.5 g/10 min, supplied by Basell. PP SD 233 CF is a random polypropylene having MFR of 4 g/10 min, supplied by Borealis HM 014 is a high density polyethylene having density of 0.960 and MFR of 4 g/10 min. EOD 99-19 is a syndiotactic polypropylene, having MFR of 20 g/10 min. supplied by TotalFina. LD 605 BA is a LDPE ( low density polyethylene), having MFR of 6.5 g/10 min supplied by ExxonMobil Chemical Co. Escorene UL00328 is EVA (ethylene-vinyl acetate copolymer), having MFR of 3 g/10 min.(ASTM-1238, using 2.16 kg loading at 190° C. and 28 wt % VA) supplied by ExxonMobil Chemical Co. ExxonMobil LL1001 XV is LLDPE ((linear low density polyethylene), having C4 as a comonomer, with MFR of 1 g/10 min. (ASTM-1238, using 2.16 kg loading at 190° C.).

TABLE 1

| Ingredients | Sample 1 | Sample 2 |
|---|---|---|
| SPC-B | 70% | 60% |
| PP HL 512 FB | 20% | 20% |
| Oppera PR 104 | 10% | 10% |
| Plastol 542 | 0% | 10% |
| Hardness (ISO 868-85) | 70 Sh A | 69 Sh A |
| Haze % (TPE-0135) | 14 | 16 |
| 1-perpendicular to flow Tensile (ISO 37 Type2) | | |
| Mod 100 (MPa) | 2.6 | 2.4 |
| Mod 200 (MPa) | 2.9 | 2.7 |
| Mod 300(MPa) | 3.2 | 3.1 |
| Elongation (%) | 1029 | 1209 |
| Tensile (MPa) | 16.4 | 14.8 |
| Tear N/m (ISO 34B, b) | 49 | 45 |
| 2-parallel to flow Tensile (ISO 37 Type2) | | |
| Mod 100 (MPa) | 2.7 | 2.7 |
| Mod 200(MPa) | 3.0 | 3.1 |
| Mod 300 (MPa) | 3.6 | 3.6 |
| Elongation (%) | 656 | 642 |
| Tensile (MPa) | 8.2 | 7.2 |
| Tear kN/m (ISO 34B, b) | 49 | 43 |

TABLE 2

| Formulation | Sample 3 | Sample 4 | Sample 5 | Sample 6 | Sample 7 | Sample 8 | Sample 9 |
|---|---|---|---|---|---|---|---|
| SPC-B | 70 | 70 | 70 | 70 | 70 | 70 | 70 |
| Exact 5062 (mPE with d = 0.860 g/cm³ and MFR = 0.5) | — | — | — | — | — | — | — |
| PP HL 512 FB (HPP, MFR = 1200) | 20 | — | — | — | — | — | — |
| PP HL 504 FB (HPP, MFR = 400) | — | 20 | — | — | — | — | — |
| PP HF 136 MO (HPP, MFR = 20) | — | — | 20 | — | — | — | — |
| PP HA 507 (HPP, MFR = 0.8) | — | — | — | — | — | — | — |
| PP 3546 G (iPP with MFR = 1200 g/cm³) | — | — | — | 20 | — | — | — |
| PP 8013 L1(RPP, MFR = 8) | — | — | — | — | 20 | — | — |
| ADSYL 5 C 30 F (Ter Random PP, MFR = 5.5 with C2 and C4 as comonomers) | — | — | — | — | — | 20 | 20 |
| PP SD 233 CF Rand PP, MFR = 7) | — | — | — | — | — | — | — |
| HM 014 (HDPE d = 0.960 and MFR = 4 g/cm³) | — | — | — | — | — | — | — |
| EOD 99-19 (sPP, MFR = 20) | — | — | — | — | — | — | — |
| LD 605 BA (MFR = 6.5) | — | — | — | — | — | — | — |
| Escorene UL00328 (MFR = 3 at 190° C., 2.16 kg loading and 28 wt % VA) | — | — | — | — | — | — | — |
| ExxonMobil LL 1001 XV (MFR = 1 at 190° C., 2.16 kg loading )(C4 as comonomer) | — | — | — | — | — | — | — |
| Oppera PR 104 | 10 | 10 | 10 | 10 | 10 | 10 | 10 |

| Parameter | Method | Test Speed/ Conditions | Specimen Size | Units | Sample 3 | Sample 4 | Sample 5 | Sample 6 | Sample 7 | Sample 8 | Sample 9 |
|---|---|---|---|---|---|---|---|---|---|---|---|
| Hardness | ISO 868 | 15 s delay | Disk 2 mm/50 mm (thickn./diameter) | Sh A | 82 | 82 | 83 | 85 | 82 | 77 | 79 |
| Haze | ASTM D-1003 | TTRAN | plaque std 2 mm | % | 21 | 14 | 11 | 12 | 13 | 37 | 8 |
| Haze of pure PO* | ASTM D-1003 | TTRAN | Pure PP/PE/EVA | % | 88 | 78 | 90 | 82 | — | 99 | — |
| Properties @ RT | | | | | Perpendicular to flow. | Perpendicular to flow. | Perpendicular to flow. | Perpendicular to flow. | Perpendicular to flow. | Perpendicular to flow. | Perpendicular to flow. |
| Tensile Strength | ISO 37 | 100 mm/min | Type I dumbbell | MPa | 18.4 | 22.0 | 24.3 | 24.6 | 21.1 | 21.4 | 19.5 |
| Elongation at Break | ISO 37 | 100 mm/min | 2 mm ISO plaque | % | 987 | 982 | 941 | 909 | 994 | 929 | 866 |
| Modulus @ 100% Strain | ISO 37 | 100 mm/min | Angle/without nick | MPa | 3.3 | 3.2 | 3.3 | 3.5 | 3.3 | 2.9 | 2.6 |
| Tear Strength | ISO 34-Ba | 500 mm/min | 2 mm ISO plaque | kN/m | 53 | 55 | 57 | 59 | 51 | 45 | 48 |
| | | | | | Parallel to flow. | Parallel to flow. | Parallel to flow. | Parallel to flow. | Parallel to flow. | Parallel to flow. | Parallel to flow. |
| Tensile Strength | ISO 37 | 100 mm/min | Type1 dumbbell | MPa | 13.6 | 9.9 | 10.3 | 10.0 | 9.9 | 8.9 | 9.4 |
| Elongation at Break | ISO 37 | 100 mm/min | 2 mm ISO plaque | % | 815 | 636 | 629 | 479 | 606 | 619 | 592 |
| Modulus @ 100% Strain | ISO 37 | 100 mm/min | Angle/without nick | MPa | 3.4 | 3.5 | 3.9 | 5.0 | 3.5 | 3.4 | 3.4 |
| Tear Strength | ISO 34-Ba | 500 mm/min | 2 mm ISO plaque | kN/m | 55 | 54 | 58 | 52 | 51 | 46 | 48 |

TABLE 3

| Ingredients | Sample 10 | Sample 11 | Sample 12 | Comparative Sample 1 | Comparative Sample 2 | Comparative Sample 3 | Comparative Sample 4 |
|---|---|---|---|---|---|---|---|
| SPC-B | 70 | 70 | 70 | 70 | 70 | 70 | 70 |
| Exact 5062 (mPE with d = 0.860 g/cm³ and MFR = 0.5) | — | — | — | — | — | — | 20 |
| PP HL 512 FB (HPP, MFR = 1200) | — | — | — | — | — | — | — |
| PP HL 504 FB (HPP, MFR = 400) | — | — | — | — | — | — | — |
| PP HP 136 MO (HPP, MFR = 20) | — | — | — | — | — | — | — |
| PP HA 507 (HPP, MFR = 0.8) | — | — | — | — | — | — | — |
| PP 3546 G (iPP with MFR = 1200 g/cm³) | — | — | — | — | — | — | — |
| PP 8013 L1(RPP, MFR = 8) | — | — | — | — | — | — | — |
| ADSYL 5 C 30 F (Ter Random PP, MFR = 5.5 with C2 and C4 as comonomers | 20 | — | — | — | — | — | — |
| PP SD 233 CF R and PP, MFR = 7) | — | 20 | — | — | — | — | — |
| HMA 0 1 4 (HDPE d = 0.960 and MFR = 4 g/cm³) | — | — | — | 20 | — | — | — |
| EOD 99-19 (sPP, MFR = 20) | — | — | — | — | — | — | — |
| LD 605 BA (LPDE MFR = 6.5) | — | — | 20 | — | 20 | — | — |
| Escorene UL00328 (MFR = 3 at 190° C., 2.16 kg loading and 28 wt % VA) | — | — | — | — | — | — | — |
| ExxonMobil LL 1001 XV (LLDPE MFR = 1 at 190° C., 2.16 kg loading )(C4 as comonomer) | — | — | — | — | — | 20 | — |
| Oppera PR 104 | 10 | 10 | 10 | 10 | 10 | 10 | 10 |

| Parameter | Method | Test Speed/ Conditions | Specimen Size | Units | Sample 10 | Sample 11 | Sample 12 | Comparative Sample 1 | Comparative Sample 2 | Comparative Sample 3 | Comparative Sample 4 |
|---|---|---|---|---|---|---|---|---|---|---|---|
| Hardness | ISO 868 | 15 s delay | Disk | Sh A | 74 | 74 | 62 | 74 | 69 | 69 | 80 |
| Haze | ASTM D-1003 | TTRAN | 2 mm/50 mm (thickn./diameter) | % | 8 | 16 | 38 | 99 | 78 | 94 | 81 |
| Haze | ASTM D-1003 | TTRAN | plaque std 2 mm Pure PP/PE/EVA | % | 84 | 14 | 18 | 99 | 93 | 87 | 88 |

Properties @ RT

| Parameter | Method | Test Speed/ Conditions | Specimen Size | Units | Sample 10 | Sample 11 | Sample 12 | Comparative Sample 1 | Comparative Sample 2 | Comparative Sample 3 | Comparative Sample 4 |
|---|---|---|---|---|---|---|---|---|---|---|---|
| Tensile Strength | ISO 37 | 100 mm/min | Type1 dumbbell | MPa | Perpendicular to flow. 17.8 | Perpendicular to flow. 13.6 | Perpendicular to flow. 15.3 | Perpendicular to flow. 16.6 | Perpendicular to flow. 15.9 | Perpendicular to flow. 17.6 | Perpendicular to flow. 15.6 |
| Elongation at Break | ISO 37 | 100 mm/min | 2 mm ISO plaque | % | 911 | 1059 | 983 | 983 | 994 | 961 | 1011 |
| Modulus @ 100% Strain | ISO 37 | 100 mm/min | Angle/without nick | MPa | 2.2 | 2.1 | 1.3 | 2.2 | 1.7 | 1.7 | 2.8 |
| Tear Strength | ISO 34-Ba | 500 mm/min | 2 mm ISO plaque | kN/m | 42 | 35 | 26 | 44 | 32 | 32 | 48 |
| Tensile Strength | ISO 37 | 100 mm/min | Type1 dumbbell | MPa | Parallel to flow 8.3 | Parallel to flow 8.6 | Parallel to flow 12.8 | Parallel to flow 11.8 | Parallel to flow 9.4 | Parallel to flow 10.7 | Parallel to flow. 11.9 |
| Elongation at Break | ISO 37 | 100 mm/min | 2 mm ISO plaque | % | 632 | 725 | 854 | 825 | 697 | 720 | 785 |
| Modulus @ 100% Strain | ISO 37 | 100 mm/min | Angle/without nick | MPa | 2.9 | 2.2 | 1.5 | 3.1 | 2.4 | 2.4 | 3.4 |
| Tear Strength | ISO 34-Ba | 500 mm/min | 2 mm ISO plaque | kN/m | 42 | 36 | 26 | 42 | 32 | 33 | 47 |

What is claimed is:

1. A transparent composition consisting of:
   a) from $\geq 20$ wt % to $\leq 50$ wt %, based on the weight of components a), b) and c), of a first polymer component (FPC) that includes polypropylene having a melting point (TM) $\geq 110°$ C.;
   b) from $\geq 10$ wt % to $\leq 70$ wt %, based on the weight of components a), b) and c), of a second polymer component (SPC) that includes a propylene polymer consisting essentially of 80 to 95 wt % units derived from propylene and from 5 to 20 wt % units derived from ethylene, including isotactically arranged propylene derived sequences and Tm <105° C. or a Heat of Fusion <45 J/g, or both;
   c) from 5 wt % to 20 wt %, based on the weight of the transparent composition of a hydrogenated hydrocarbon resin having a Tg $\geq 40°$ C. and $\leq 90°$ C., as determined by DSC, a polydispersity as measured by Mw/Mn of from 1.5 to 3.5, a softening point of from 120° C. to 180° C., as measured as a ring and ball softening point according to ASTM E-28; and
   d) an additive oil in an amount of from $\leq 15$wt% based on the total weight of components a), b), c) and the additive oil;
   wherein the transparent composition has a:
   Haze value of $\leq 16$ percent; and
   Shore A Hardness of 90 or below.

2. An article formed of the composition of claim 1, wherein the article is formed by molding, extrusion, or calendaring.

3. The article according to claim 2 where the article is a sealing element, a grip, a touchpad, or an insert.

4. The composition of claim 1 wherein the polypropylene is selected from the group consisting of isotactic polypropylene, impact copolymers of propylene, and random copolymers of propylene.

5. The composition of claim 1, where the hydrocarbon resin has a softening point, as measured as a ring and ball softening point according to ASTM E-28, of from 125° C. to 180° C.

6. The composition of claim 1, where the hydrocarbon resin is present in an amount ranging from a lower limit of 10% by weight to an upper limit of 20% by weight based upon the total weight of the composition.

7. The composition of claim 1, wherein the hydrocarbon resin is a hydrogenated aliphatic hydrocarbon resin.

8. The composition of claim 7, wherein the hydrocarbon resin is a hydrogenated aromatic modified aliphatic hydrocarbon resin.

9. The composition of claim 1, wherein the hydrocarbon resin is a hydrogenated polycyclopentadiene resin.

10. The composition of claim 1, where the SPC is present in an amount of $\geq 30$ weight percent and $\leq 70$ weight percent.

11. The composition of claim 1, where the SPC is present in an amount of $\geq 35$ weight percent and $\leq 70$ weight percent.

12. The transparent composition of claim 1, wherein the hydrocarbon resin is a cycloaliphatic hydrocarbon.

13. The transparent composition of claim 1, wherein the number average molecular weight (Mn) of the hydrocarbon resin is 2,000 or less.

* * * * *